United States Patent
Lin et al.

(10) Patent No.: US 8,909,718 B2
(45) Date of Patent: Dec. 9, 2014

(54) METHODS AND SYSTEMS FOR INCORPORATING A THIRD USER INTO AN INSTANT MESSAGE SESSION

(75) Inventors: Lin Lin, Belleville (CA); Ping Lin, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 252 days.

(21) Appl. No.: 13/172,098

(22) Filed: Jun. 29, 2011

(65) Prior Publication Data

US 2013/0007138 A1    Jan. 3, 2013

(51) Int. Cl.
*G06F 15/16* (2006.01)
*H04L 12/64* (2006.01)

(52) U.S. Cl.
CPC .................................. *H04L 12/6418* (2013.01)
USPC ............ 709/206; 709/207; 709/238; 370/352

(58) Field of Classification Search
CPC ... H04L 51/04; H04L 12/581; H04L 12/5815; G06F 15/16; G06F 8/61
USPC ........................... 709/206, 207, 238; 370/352
See application file for complete search history.

(56) References Cited

U.S. PATENT DOCUMENTS

| | | | |
|---|---|---|---|
| 7,411,939 B1 * | 8/2008 | Lamb et al. .................. | 370/352 |
| 7,428,580 B2 | 9/2008 | Hullfish et al. | |
| 7,716,289 B2 | 5/2010 | Malik | |
| 8,280,962 B2 * | 10/2012 | Muniz et al. .................. | 709/206 |
| 2003/0105822 A1 * | 6/2003 | Gusler et al. .................. | 709/206 |
| 2004/0193727 A1 * | 9/2004 | Varga et al. .................... | 709/238 |
| 2007/0143433 A1 * | 6/2007 | Daigle .......................... | 709/207 |
| 2007/0168448 A1 * | 7/2007 | Garbow et al. ............... | 709/207 |
| 2008/0043971 A1 | 2/2008 | Barchi | |
| 2008/0189374 A1 | 8/2008 | Odell et al. | |
| 2009/0235184 A1 * | 9/2009 | Perlson et al. ................ | 715/758 |
| 2010/0035640 A1 * | 2/2010 | Lew et al. ..................... | 455/466 |
| 2010/0138658 A1 * | 6/2010 | Logue et al. .................. | 713/170 |
| 2010/0273447 A1 * | 10/2010 | Mann et al. ................... | 455/405 |
| 2011/0246251 A1 * | 10/2011 | Saunders et al. ............. | 705/7.12 |
| 2012/0079040 A1 * | 3/2012 | Odell et al. ................... | 709/206 |

* cited by examiner

*Primary Examiner* — Tesfay Yohannes
(74) *Attorney, Agent, or Firm* — Withrow and Terranova, PLLC

(57) ABSTRACT

A method and apparatus for incorporating a third user into an instant message (IM) session. In one embodiment, an IM server receives a first IM from a first user directed toward a second user. The IM server makes a determination that the second user is not available to respond to the first IM. In response to the determination, the IM server identifies a third user to whom the first IM is to be forwarded, and automatically forwards the first IM to the third user. In another embodiment, the IM server receives a transfer request from the second user to transfer the IM session from the second user to the third user. The IM server automatically determines a subset portion of a plurality of IMs communicated between the first user and the second user, and provides the transfer request and the subset portion to the third user.

17 Claims, 15 Drawing Sheets

METHODS AND SYSTEMS FOR INCORPORATING A THIRD USER INTO AN INSTANT MESSAGE SESSION

FIELD OF THE DISCLOSURE

Embodiments disclosed herein relate to message communications, and in particular to incorporating a third user into an instant message session between a first user and a second user.

BACKGROUND

Instant messaging has become a widespread means of communication. Instant messaging is particularly useful where only a short series of exchanges between a first individual and a second individual may be all that is necessary to obtain desired information. In these situations, instant messaging offers several advantages over other, more traditional communication mechanisms, such as voice calls. In particular, instant messaging eliminates the need to locate and dial a telephone number and wait for a call to initiate, and it also eliminates a potential concern of the calling party that the telephone call may be an interruption to the called party. Moreover, convention has dictated that an instant message (IM) user is not necessarily expected to initiate an IM conversation with the pleasantries associated with a telephone call, such as asking the called party how they are doing or other personal inquiries of a similar nature, which, while socially desirable, may be an impediment to obtaining the information desired by the IM user in a timely manner.

Consequently, instant messaging has become widespread in many different contexts. For example, while in the past a website would publish a telephone number for consumers to call in the event that the consumer had a question, it is now quite common for website operators to offer support through IM sessions that can be initiated by the consumer by a simple click of a mouse.

However, instant messaging has not necessarily evolved to include functionality that would be desirable given the increasing prevalence of instant messaging as a means of communication. For example, in the situation of a website operator providing customer support via an IM session, it would be beneficial to a consumer if a first-level support technician could transfer an ongoing IM session to a designated third user, such as a second-level support technician, in the event that the first-level support technician cannot provide adequate support to the consumer. Moreover, in addition to an ability to transfer the IM session to the second-level support technician, it would be beneficial if the second-level support technician could be provided with some contextual information about the nature of the IM session either prior to or after accepting a request to transfer the IM session, so that the second-level support technician is able to quickly provide the necessary support to the consumer.

Conventionally, when an IM is sent toward a recipient, one of several different actions may be performed by the IM system. If the IM system determines that the recipient currently has an IM client application running on a computing device, the IM system may push the IM to the client IM application, where the IM may be displayed on a display, irrespective of whether the recipient is available to respond to the IM or not. Alternately, if the IM system determines that the recipient does not currently have a client IM application running on a computing device, the IM system may store the IM in a message log associated with the recipient. The IM may subsequently be delivered to the client IM application when the recipient later runs the client IM application on the computing device. In either event, the sender of the IM awaits a response from the recipient, not knowing if the response will be provided instantaneously or days later. In some situations, it may be desirable to both the sender of the IM and the recipient if the IM system were capable of determining whether the recipient was available to respond to the IM, and if not, to automatically forward the IM to a designated third user and to initiate an IM session between the third user and the first user so that the first user can obtain the desired information from the third user while the second user is unavailable to respond.

SUMMARY

Embodiments disclosed herein relate to introducing a third user into an instant message (IM) session between a first user and a second user. In one embodiment, the introduction of the third user may be initiated automatically by an IM system in response to a determination that the second user is not available to respond to an IM message sent by the first user to the second user. This may be referred to herein generally as IM forwarding. In particular, the IM system receives a first IM from the first user that is directed toward the second user, and makes a determination that the second user is not available to respond to the IM. This determination may be based on any of a number of different criteria, such as a presence status of the second user, a configuration parameter indicating that the second user is not available, a determination that the second user does not have a client IM application running, or the like. In one embodiment, the determination may be made after the IM system has delivered the IM to the second user and a predetermined period of time has elapsed without a response from the second user.

The IM system then identifies the third user to whom the IM message should be forwarded, and automatically forwards the IM to the third user. The IM system may first initiate a new IM session between the first user and the third user, or may transfer the existing IM session between the first user and the second user to the third user, such that IM messages sent by the first user are conveyed by the IM system to the third user, and vice versa. Alternately, the IM system may place the IM session between the first user and the second user in a "forwarding state," and only while the IM session is in the forwarding state, deliver IM messages from the first user to the third user and vice versa. The IM system may, after a predetermined period of time has elapsed without communications between the first user and the third user, revert the IM session from the forwarding state to the original state, such that IMs sent by the first user are delivered to the second user and are no longer delivered to the third user.

In one embodiment, IM messages exchanged between the first user and the third user may be attached (i.e., stored or inserted) to a message log associated with the second user, and subsequently or concurrently delivered to the second user so that the second user can observe the communications that occur between the first user and the third user.

In one embodiment, the IM system may identify different third users to whom an IM should be delivered based on different senders of IMs. For example, configuration data associated with the second user may indicate that an IM from the first user should be forwarded to the third user, and an IM from a fourth user should be forwarded to a fifth user.

In another embodiment, the introduction of the third user may be initiated at the request of the second user during an ongoing IM session with the first user. This may be referred to herein generally as IM session transfer. For example, the second user may realize that he or she is not able to answer questions posed by the first user, and in response, may initiate an IM session transfer request to transfer the IM session from the second user to the third user. The IM system receives the transfer request, and automatically determines a subset portion of IMs from the IM session between the first user and the second user to provide to the third user. The IM system provides the subset portion of the IMs to the third user. The third user may then read the IMs and decide to accept the transfer request or to reject the transfer request. If the third user accepts the transfer request, the IM system transfers the IM session from the second user to the third user such that subsequent IMs from the third user will automatically be delivered to the first user, and subsequent IMs from the first user will automatically be delivered to the third user.

In another embodiment, the second user may provide a summary description in conjunction with the request to transfer the IM session from the second user to the third user. The IM system delivers the summary description to the third user, who may then read the summary description prior to accepting or rejecting the IM session transfer request.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
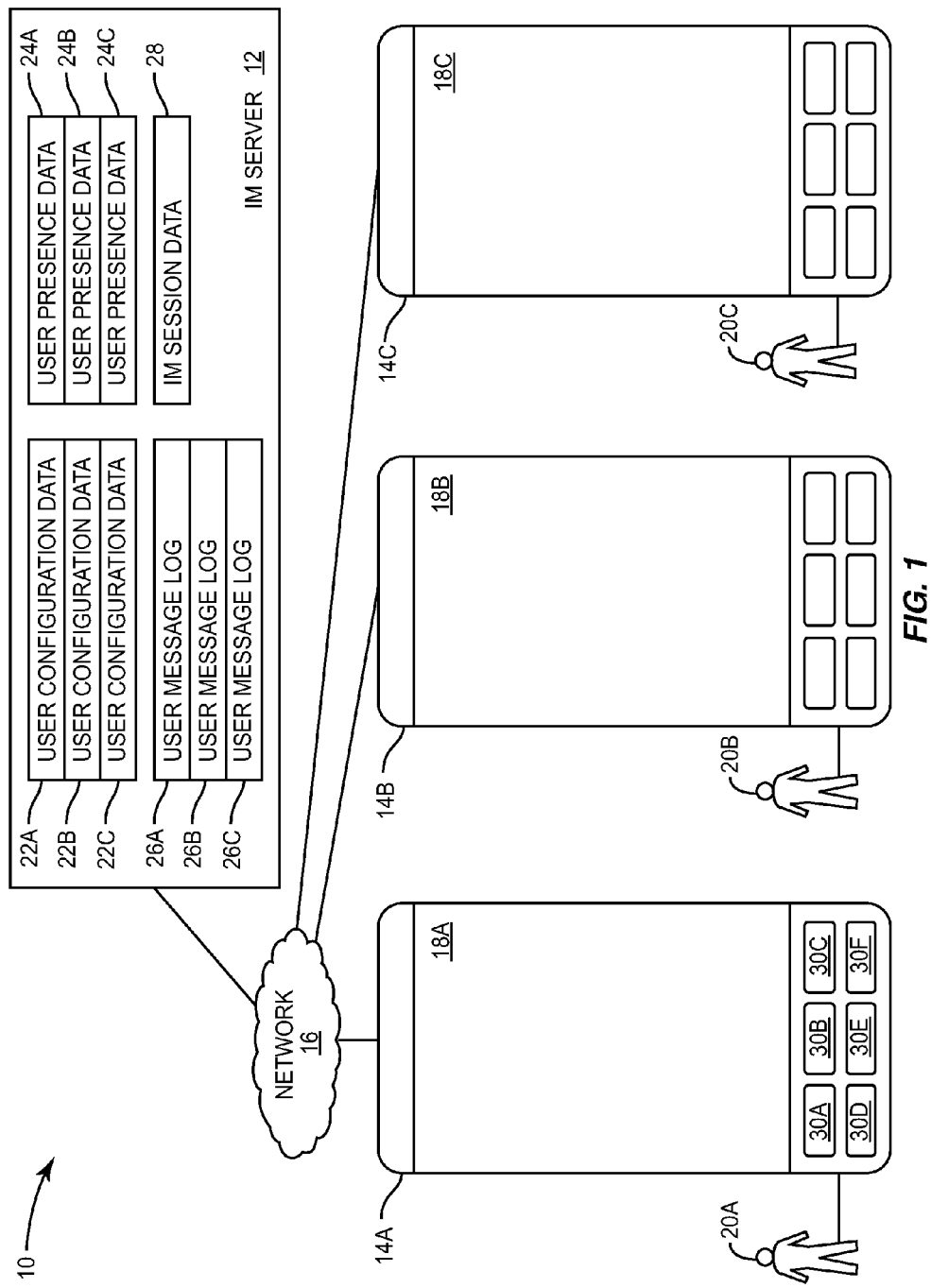
FIG. 1 is an exemplary block diagram of an instant message (IM) system in which embodiments disclosed herein may be practiced.

Embodiments disclosed herein relate to introducing a third user into an instant message (IM) session between a first user and a second user. Some embodiments disclosed herein relate to the automatic introduction of the third user into an IM session, sometimes referred to herein as IM forwarding. Other embodiments relate to user-initiated introduction of a third user into an IM session, sometimes referred to herein as IM session transfer. FIG. 1 is block diagram of an IM system 10 in which either IM forwarding embodiments or IM session transfer embodiments may be practiced. The IM system 10 includes a computing device, such as an IM server 12, which implements functionality to enable IM messages, such as IM text messages or IM multimedia messages, to be communicated to and from a plurality of computing devices 14A-14C (generally, computing devices 14 or computing device 14). The IM server 12 may comprise, for example, a conventional or special purpose computer that contains software, hardware, and firmware, or any combination thereof, suitable for implementing the functionality discussed herein. The computing devices 14 may comprise any suitable computing device capable of accepting user input, displaying content, and communicating with other devices, such as the IM server 12 or other computing devices 14, via a network 16. In particular, the computing devices 14 may comprise, for example, a desktop or laptop computer, a personal digital assistant (PDA), a smartphone such as an Apple® iPhone® or RIM® BlackBerry®, a gaming console, a conventional cellular phone, or the like.

The network 16 may comprise one or more communication networks suitable for facilitating message communication between the computing devices 14 and the IM server 12, such as, for example, one or more wired or wireless local area networks (LANs), enterprise networks, service provider networks, or public networks, such as the Internet.

The computing devices 14A-14C include corresponding displays 18A-18C (generally, displays 18), which may be coupled to or, as depicted in FIG. 1, integral with the computing devices 14. The displays 18 may be used to present to a corresponding user 20A-20C (generally, user 20 or users 20) IMs delivered to the respective computing device 14, and IMs sent from the respective computing device 14. Typically, in order to implement IM functionality, a computing device 14 executes in IM client application which presents a user interface on the display 18 via which the user 20 can interact with the IM client application. Such interaction can comprise receiving and viewing IMs sent from another user 20, entering and sending IMs to another user 20, saving chat histories that comprise IMs of an IM session between the user 20 and another user 20, and the like.

The IM server 12 operates in conjunction with the IM client applications executing on the computing devices 14, and provides IM functionality such as establishing IM sessions, conveying IMs from one computing device 14 to another computing device 14, implementing certain user preferences identified by a user 20, and the like. While for purposes of illustration and clarity the embodiments disclosed herein are described in conjunction with a single IM system implemented via the IM server 12, such embodiments are equally applicable to distributed IM systems that may enable IMs between users that are registered with different IM services, such as AOL Instant Messenger, Yahoo! Messenger, Google Talk, or the like.

The IM server 12 may maintain a variety of information in conjunction with implementing the IM system 10. For example, each user 20A-20C may have corresponding user configuration data 22A-22C (generally, user configuration data 22) which is maintained by the IM server 12, and which, as discussed in greater detail herein, may store data used by the IM server 12 to implement desired functionality as configured by either the corresponding user 20 or a system administrator. The IM server may also store and otherwise maintain user presence data 24A-24C (generally, user presence data 24), which identifies presence information, such as a current presence status or indicator, that corresponds to the respective users 20A-20C. Such presence status may be provided to the IM server 12 by the respective computing device 14 periodically, or as the presence status changes. Presence status may be obtained at a computing device 14 automatically, or may be manually set by a corresponding user 20. For example, if the user 20A fails to respond to an IM for greater than a predetermined time, such as 15 minutes, the computing device may designate the presence status of the user 20A as "Idle" or "Away," and provide such presence status to the IM server 12. As another example, the user 20B may indicate, via a user interface, for example, to the computing device 14B that her presence status is "Out to lunch," which the computing device 14B may provide to the IM server 12.

The IM server 12 may also maintain user message logs 26A-26C (generally, user message log 26), which contain IMs associated with the corresponding users 20A-20C. As will be discussed in greater detail herein, an IM may be stored, displayed, or otherwise maintained in a number of locations. For example, an IM sent from the user 20A via the computing device 14A to the user 20C may be maintained in a chat history maintained on the computing device 14A, and may also be presented on the display 18A for the user 20A. The IM is first transmitted to the IM server 12, which makes a copy of the IM and attaches, or otherwise stores, the IM in the user configuration data 22A that is associated with the user 20A. The IM server 12 determines that the IM is destined for the user 20C, and thus stores another copy of the IM in the user configuration data 22C that is associated with the user 20C. The IM server 12 then transmits, or otherwise delivers, the IM to the computing device 14C, which in turn stores the IM in a chat history, and displays the IM to the user 20C via the display 18C.

The IM server 12 may also store IM session data 28 which maintains information about IM sessions between users 20, such as session initiation time, users 20 associated with the session, and the like.

While for purposes of illustration and clarity, IMs may be discussed herein as being sent by one user 20 and received by another user 20, it will be understood that IMs are communicated between respective computing devices 14, under the control of the corresponding user 20. Functionality of a computing device 14 may be controlled by the user 20 in any number of ways, including via a touchscreen display 18 or one or more control keys 30A-30F.

Figure 2:
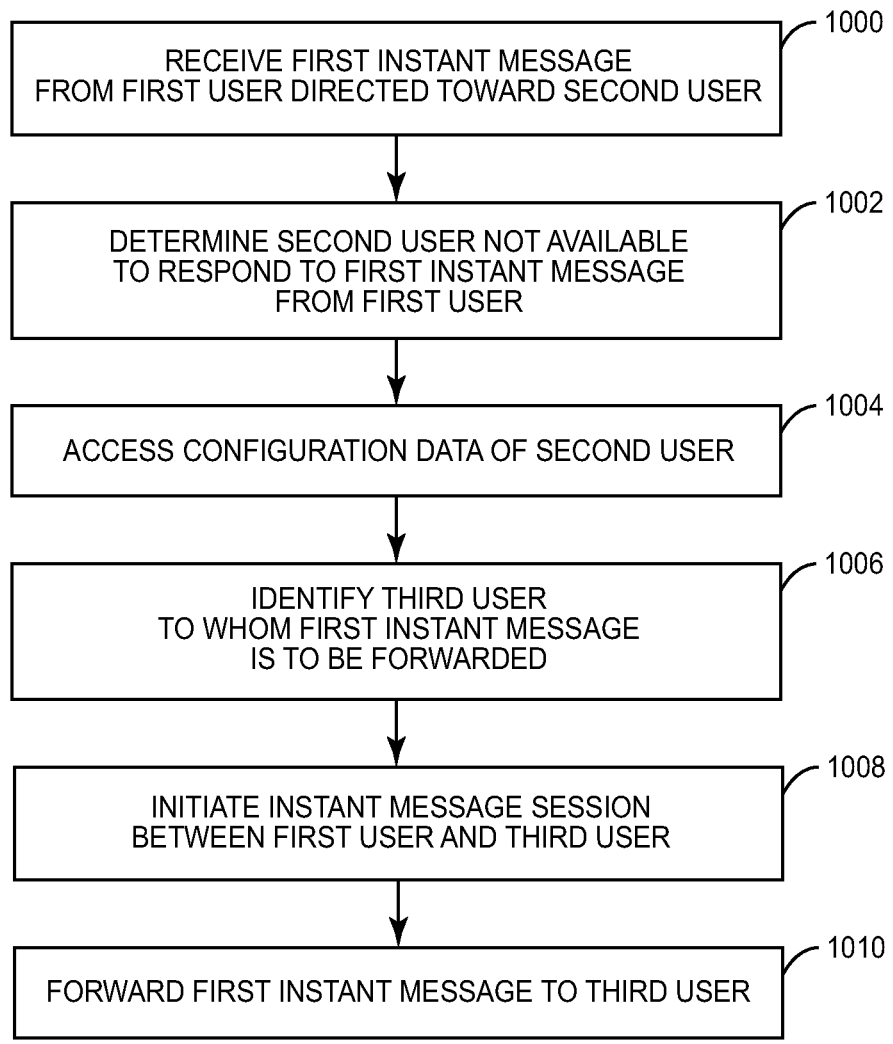
FIG. 2 is a flowchart illustrating exemplary steps for performing IM forwarding according to one embodiment.
Figure 3:
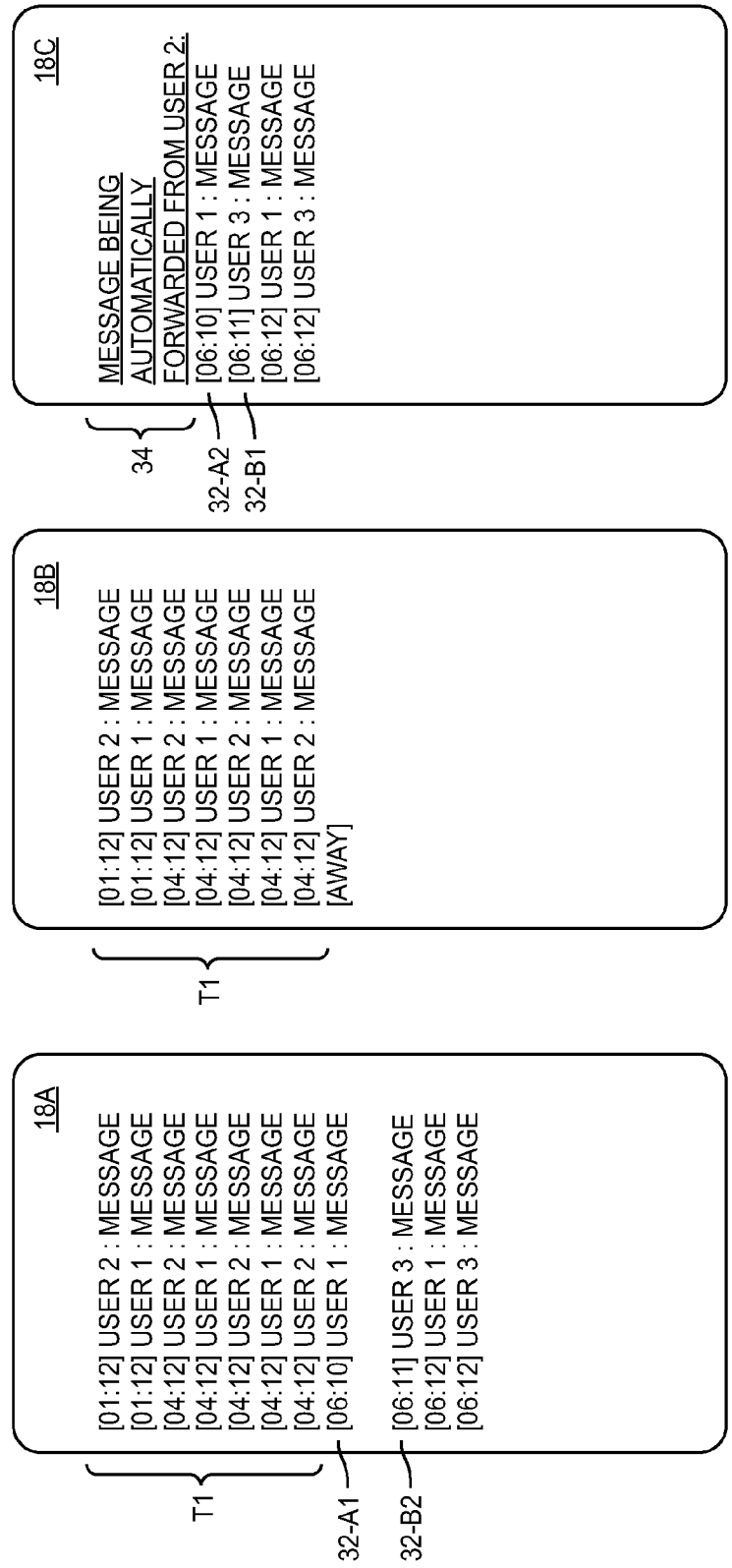
FIG. 3 is a block diagram depicting exemplary displays and IMs that may be presented on the displays.

FIG. 2 is a flowchart illustrating exemplary steps for performing IM forwarding according to one embodiment. FIG. 3 is a block diagram depicting exemplary displays 18 and IMs that may be presented on the displays 18. FIG. 2 will be discussed in conjunction with FIGS. 1 and 3. For purposes of illustration, the user 20A will be referred to as the first user 20A, the user 20B will be referred to as the second user 20B, and the user 20C will be referred to as the third user 20C. However, throughout this specification, the use of ordinals such as first, second, and third is merely for explanatory purposes, to distinguish between otherwise similar elements (in this example, the users 20), and does not imply any type of importance, priority, or order. For purposes of illustration, only enlarged displays 18 are depicted in FIG. 3, however, as would be understood, the displays 18 are coupled to or integral with corresponding computing devices 14, as discussed with regard to FIG. 1. Each of the displays 18 depicts a plurality of IMs, and for each IM, a time of the IM is identified, the user who sent the IM is identified, and the word "MESSAGE" represents the text of a particular IM, each of which would likely differ from one another to some extent. "USER 1" corresponds to the first user 20A, "USER 2" corresponds to the second user 20B, and "USER 3" corresponds to the third user 20C.

Assume that at time T1 (FIG. 3), the displays 18A and 18B contain the IMs bracketed by the bracket T1, and the display 18C is blank. Assume further that at time 06:10, the first user 20A types and sends IM 32-A1 (generally, IM 32) toward the second user 20B. The phrase "sends toward" means that the user 20A has designated the second user 20B as the recipient of the IM 32-A1. The IM 32-A1 is communicated by the computing device 14A to the IM server 12 (FIG. 1). The IM server 12 receives the IM 32-A1 (FIG. 2, step 1000). Assume that the IM server 12 then makes a determination that the second user 20B is not available to respond to the IM 32-A1 (step 1002). Such determination may be made based on one or more criteria, which may be maintained in the user configuration data 22B, or in the user presence data 24B, for example. For example, the second user 20B may have identified certain days, dates, time ranges throughout the day, or other criteria when the second user 20B may not be available to respond to IMs. Alternately, the determination may be made based on a presence status of the second user 20B, such as "Away," "Idle," or the like. In one embodiment the IM server 12 may make the determination after the IM 32-1A has been sent to the second user 20B, and the second user 20B has failed to respond to the IM 32-1A after a predetermined period of time, which may, for example, be designated in the user configuration data 22B.

After the determination has been made, the IM server 12 accesses the user configuration data 22B to identify a user 20 to whom IMs should be forwarded in the event that a determination is made that the second user 20B is unavailable to respond to the IM 32-1A (step 1004). In this example, assume that the second user 20B has identified the third user 20C as the user to whom the IM 32-1A should be forwarded (step 1006). The IM server 12 then sets up an IM session between the first user 20A and the second user 20C, and forwards the IM 32-1A to the third user 20C (steps 1008, 1010). In one embodiment, the IM server 12 may first determine whether the third user 20C is available to respond to the IM 32A, and if not, may access a prioritized list of users 20 in the user configuration data 22B identifying in the order of priority the users 20 to whom an IM should be forwarded in the event that the previous users 20 are not available to respond to the IM 32-1A.

In one embodiment, the IM server 12 may initiate a new IM session between the first user 20A and the third user 20C. In another embodiment, the IM server 12 may simply transfer the IM session from the second user 20B to the third user 20C, such that the second user 20B is no longer involved in the IM session, even if the second user 20B becomes available. In yet another embodiment, the IM server 12 may simply join the third user 20C to the IM session between the first user 20A and the second user 20B such that IMs from the first user 20A are delivered to both the second user 20B and the third user 20C, and IMs from the third user 20C are delivered to both the first user 20A and the second user 20B. In yet another embodiment, the IM server 12 may place the IM session between the first user 20A and the second user 20B in a forwarding state, and only while the IM session is in the forwarding state, deliver IM messages from the first user 20A to the third user 20C and vice versa. The IM system 10 may, after a predetermined period of time has elapsed without communications between the first user 20A and the third user 20C, revert the IM session from the forwarding state to the original state, such that IMs sent by the first user 20A are delivered to the second user 20B and are no longer delivered to the third user 20C.

FIG. 3 illustrates an embodiment wherein IMs between the first user 20A and the third user 20C are not delivered to the second user 20B. Upon the determination that the IM server 12 should forward the IM 32-A1 to the third user 20C, the IM server 12 may first deliver an explanatory message 34, indicating that one or more IMs are being forwarded, and then deliver the IM 32-A1 to the third user 20C, where it is presented as IM 32-A2 on the display 18C. The third user 20C may then respond with an IM 32-B1, which is sent via the IM server 12 to the first user 20A and displayed as IM 32-B2 on the display 18A. Subsequent IMs may also be exchanged between the first user 20A and the third user 20C, as illustrated on the displays 18A, 18C.

Figure 4:
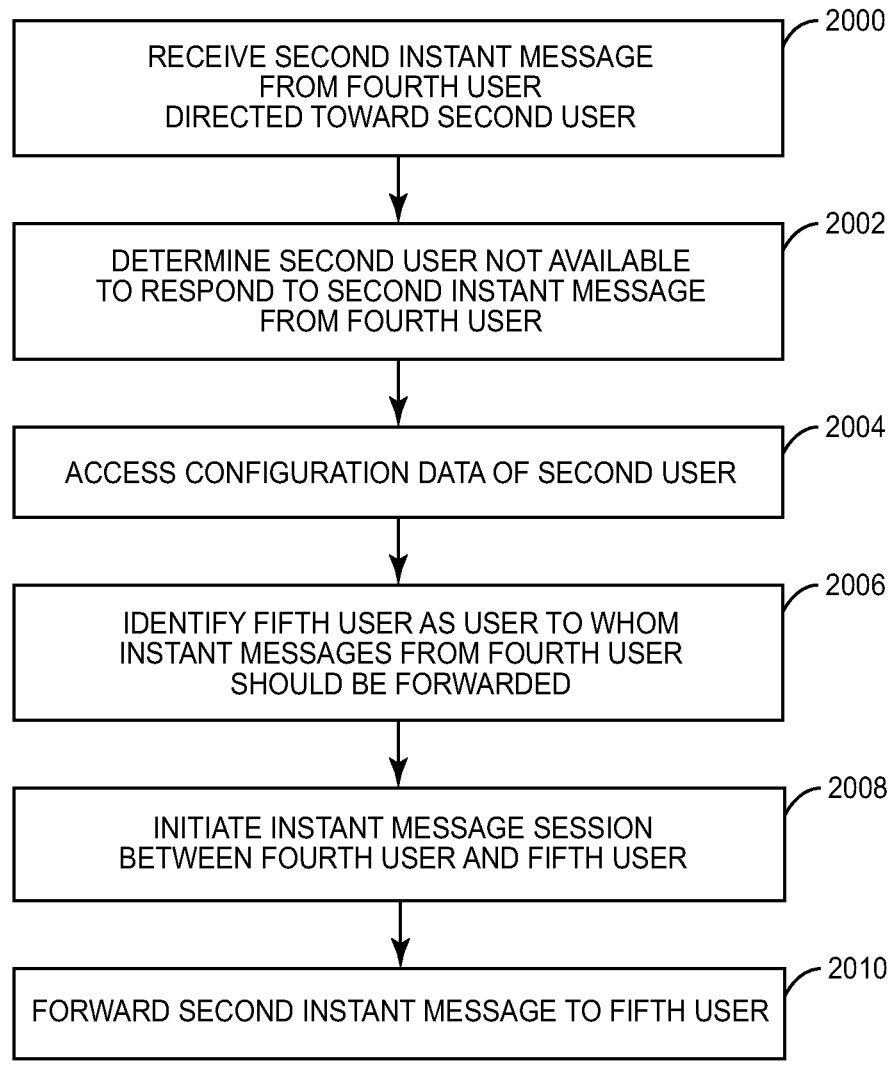
FIG. 4 is a flowchart illustrating exemplary steps for performing IM forwarding upon receipt of an IM according to another embodiment.

FIG. 4 is a flowchart illustrating exemplary steps for performing IM forwarding upon receipt of an IM according to another embodiment. FIG. 4 will also be discussed in conjunction with FIG. 1. In this embodiment, aspects of IM forwarding may be based on the identification of the sender of the IM. Assume another user 20, referred to herein as a fourth user 20 (not shown), sends an IM toward the second user 20B. The IM server 12 receives the IM (step 2000), and determines that the second user 20B is not available to respond to the IM (step 2002), as discussed above with regard to FIG. 2. The IM server 12 accesses the user configuration data 22B of the second user 20B (step 2004), and in this embodiment, determines that the second user 20B has identified different users 20 to whom an IM should be forwarded based on an identity of the sending user 20. The IM server 12 identifies the sender of the IM as the fourth user 20, and determines that a fifth user 20 (not shown) is the user to whom IMs from the fourth user 20 should be forwarded if the second user 20B is not available to respond to IMs (step 2006). Thus, in this embodiment, the second user 20B may identify different users 20 to whom IMs should be forwarded based on different senders. The second user 20B may also designate a default user 20 to whom IMs should be forwarded unless a specific user 20 has been identified for the specific sender. As discussed above with regard to FIG. 2, the IM server 12 may initiate an IM session between the second user 20B and the fifth user 20, join the fifth user 20 to the existing IM session between the second user 20B and the fourth user 20, or place the existing IM session into a forwarding state (step 2008), and sends the IM to the fifth user 20 (step 2010).

In another embodiment, aspects of IM forwarding may be conditioned on the identification of the sender of the IM, such that IMs from some senders may be forwarded, but IMs from other senders may not be forwarded. This may be implemented, for example, via a "Do Not Forward" list that identifies particular senders, such as friends, family, or the like, from which IMs should not be forwarded.

Figure 5:
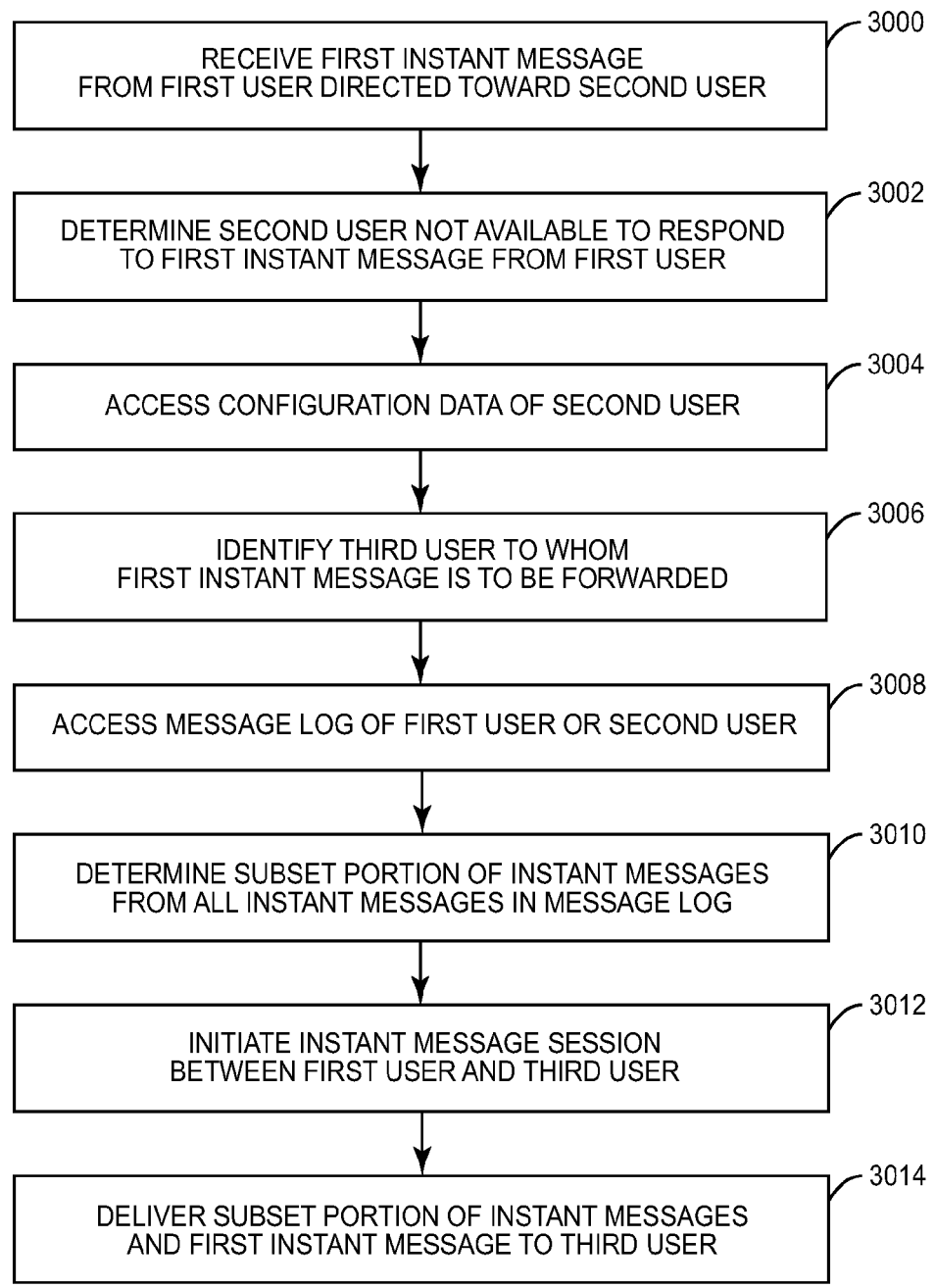
FIG. 5 is a flowchart illustrating exemplary steps for performing automatic selection of a subset portion of previous IMs that can be automatically provided to the user to whom an IM is being forwarded to help the user understand the context of the IM that is being forwarded.
Figure 6:
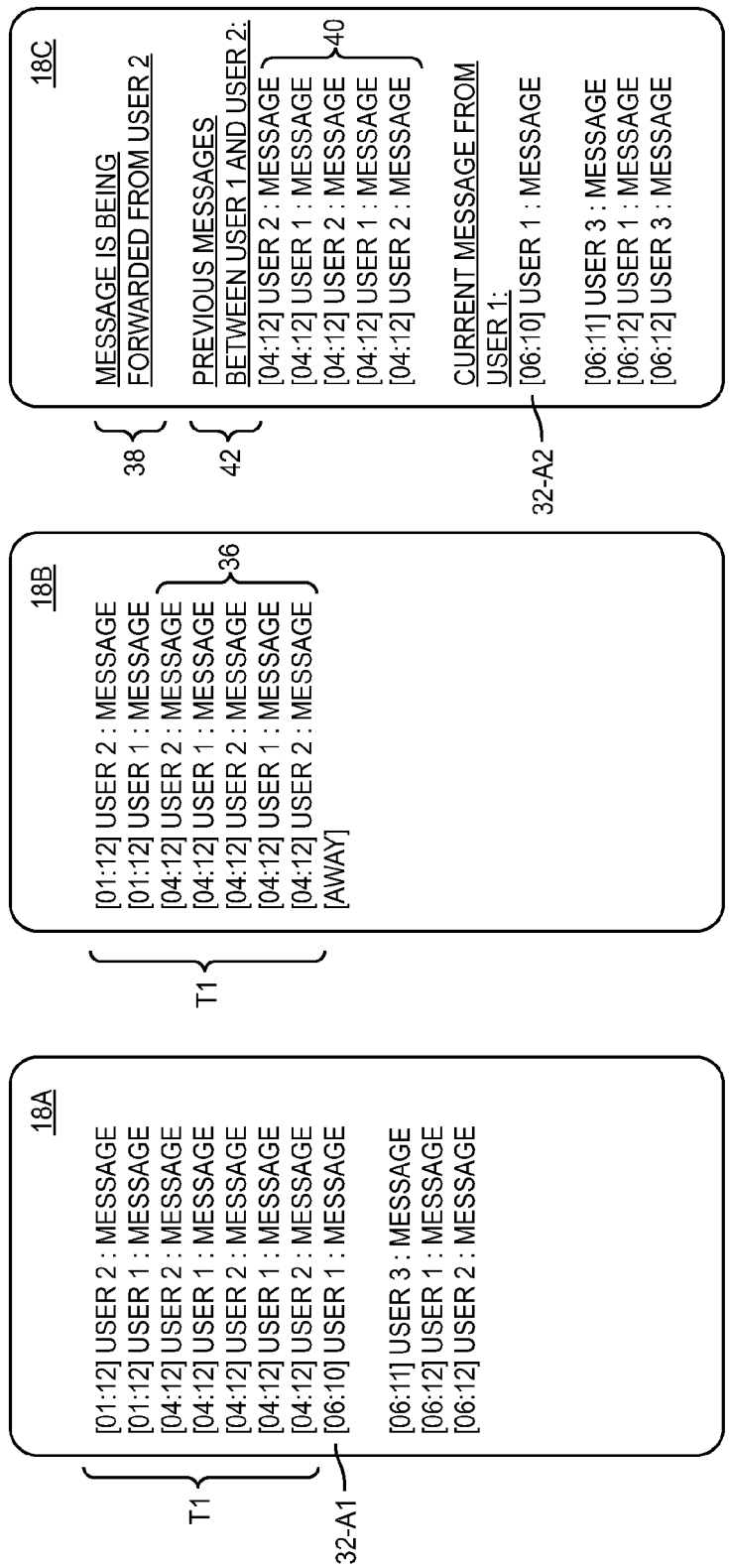
FIG. 6 is a block diagram depicting displays and exemplary IMs that may be presented on the displays in the embodiment discussed with regard to FIG. 5.

FIG. 5 is a flowchart illustrating exemplary steps for performing automatic selection of a subset portion of previous IMs that can be automatically provided to the user 20 to whom an IM is being forwarded to help the user 20 understand the context of the IM that is being forwarded. FIG. 6 is a block diagram depicting displays 18 and exemplary IMs that may be presented on the displays 18 in the embodiment discussed with regard to FIG. 5. FIG. 6 will be discussed in conjunction with FIGS. 1 and 5.

Similar to what was discussed with regard to FIG. 2, assume that at time T1, the displays 18A and 18B contain the IMs bracketed by the bracket T1, and the display 18C is blank. Assume further that at time 06:10, the first user 20A types and sends the IM 32-A1 toward the second user 20B. The IM server 12 receives the IM 32-A1 (FIG. 5, step 3000), and determines that the second user 20B is not available to respond to the IM 32-A1 (step 3002). The IM server 12 accesses the user configuration data 22B of the second user 20B (step 3004). The IM server 12 identifies the third user 20C as the user 20 to whom IMs should be forwarded if the second user 20B is not available to respond to IMs (3006).

In this embodiment, the IM server 12 then accesses one of the user message logs 26A or 26B of the first user 20A or the second user 20B, respectively (step 3008). The IM server 12 determines a subset portion of a plurality of IMs previously communicated between the first user 20A and the second user 20B prior to receiving the IM 32-A1 (step 3010). The subset portion may be determined based on a likelihood that the IMs in the subset portion relate to the topic of the IM 32-A1. Such determination may be made in any number of ways, including via text analysis of the IM 32-A1 and the selected user message log 26 to determine related IMs, or by selecting a most recent subset of IMs from the selected user message log 26, based on, for example, a predetermined amount of time between the IMs in the selected user message log 26.

Assume that the IM server 12 selects the IMs bracketed by bracket 36 as the subset portion of IMs. The IM server 12 may then initiate an IM session between the first user 20A and the third user 20C, as discussed above with regard to FIGS. 2 and 4 (step 3012). The IM server 12 may then send the third user 20C an explanatory message 38 indicating that an IM is being automatically forwarded from the second user 20B. The IM server 12 then provides the third user 20C with the subset portion of IMs, as indicated by bracket 40 (step 3014). The subset portion of IMs may be provided with an explanatory message 42 if desired. The subset portion of IMs enables the third user 20C to understand the context of the IM conversation that preceded the delivery of the IM being forwarded. The IM 32-A1 is then delivered to the third user 20C, and displayed as the IM 32-A2 on the display 18C.

It should be noted that while for purposes of illustration, steps have been described as occurring in a certain order, the embodiments recited herein are not limited to any particular order of steps. For example, with regard to FIG. 5, the IM server 12 may establish an IM session between the first user 20A and the third user 20C prior to determining the subset portion of IMs. As another example, the IM server 12 may send the IM 32-A1 to the third user 20C prior to sending the subset portion of IMs to the third user 20C, along with, or without, explanatory messages. It will be apparent to those skilled in the art that many of the steps discussed throughout the specification may be performed in a different order from that presented herein without departing from the scope of the embodiments disclosed herein.

Figure 7:
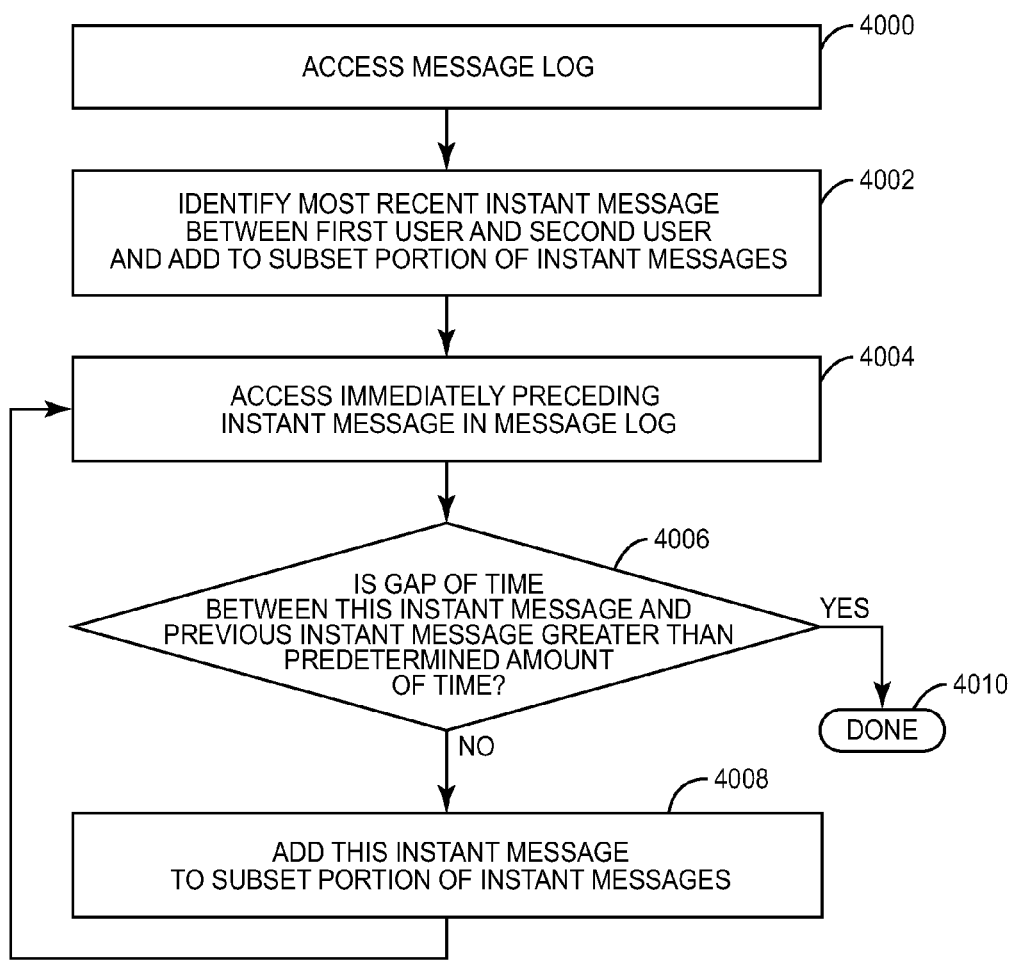
FIG. 7 is a flowchart illustrating exemplary steps for identifying a subset portion of IMs for delivery to a user to whom IMs are being forward, according to one embodiment.
Figure 8:
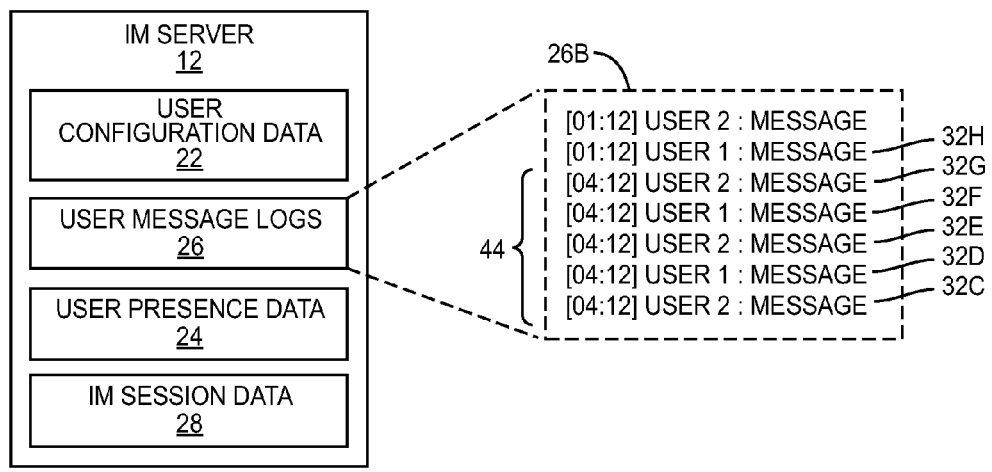
FIG. 8 is a block diagram illustrating an exemplary message log of the second user.

FIG. 7 is a flowchart illustrating in greater detail exemplary steps for identifying a subset portion of IMs for delivery to a user 20 to whom IMs are being forwarded as discussed with regard to FIG. 5, according to one embodiment. FIG. 8 is a block diagram illustrating an exemplary message log 26B of the second user 20B. FIG. 7 will be discussed in conjunction with FIG. 8. Assume that, as discussed with regard to FIG. 5, the IM server 12 has received an IM that is directed toward the second user 20B, and will ultimately be forwarded to the third user 20C. Assume further that the IM server 12 accesses the message log 26B of the second user 20B in order to identify the subset portion of IMs (step 4000). The user message log 26B may comprise a plurality of IMs, including IMs from one or more previous conversations with the first user 20A, which are in chronological order. It should be noted that the IM server may store many different message logs 26 for the second user 20B, with each message log 26 being associated with an IM session between the second user 20B and a different user 20.

The IM server 12 identifies a most recent IM 32C (FIG. 8) between the first user 20A and the second user 20B from the user message log 26B and adds the IM 32C to the subset portion of IMs (step 4002). The IM server 12 then accesses an immediately preceding IM 32D in the user message log 26B (step 4004). The IM server 12 then determines if the gap of time between the IM 32C and the IM 32D is greater than a predetermined amount of time (step 4006). The predetermined amount of time may be system configured or user configured, and may have been obtained, for example, from the user configuration data 22B. In this example, assume that the predetermined amount of time is 90 minutes. The gap of time between the IM 32D and the IM 32C is less than one minute, so the IM server 12 determines that the gap of time is not greater than the predetermined amount of time, and adds the IM 32D to the subset portion of IMs (step 4008). The IM server 12 then repeats this process for IMs 32E-32G, and adds IMs 32E-32G to the subset portion (steps 4006, 4008). The IM server 12 ultimately accesses IM 32H, and determines that the amount of time between the IM 32G and the IM 32H is greater than the predetermined amount of time. The IM server 12 has therefore identified the subset portion of IMs, as depicted by bracket 44 (step 4010), which may then be provided to the third user 20C, as discussed with regard to FIG. 5. As discussed previously, identifying the subset portion of IMs based on a gap of time between successive IMs is but one method of many possible methods that the subset portion of IMs may be identified, and the embodiments are not limited to any particular process for determining the subset portion of IMs.

Figure 9:
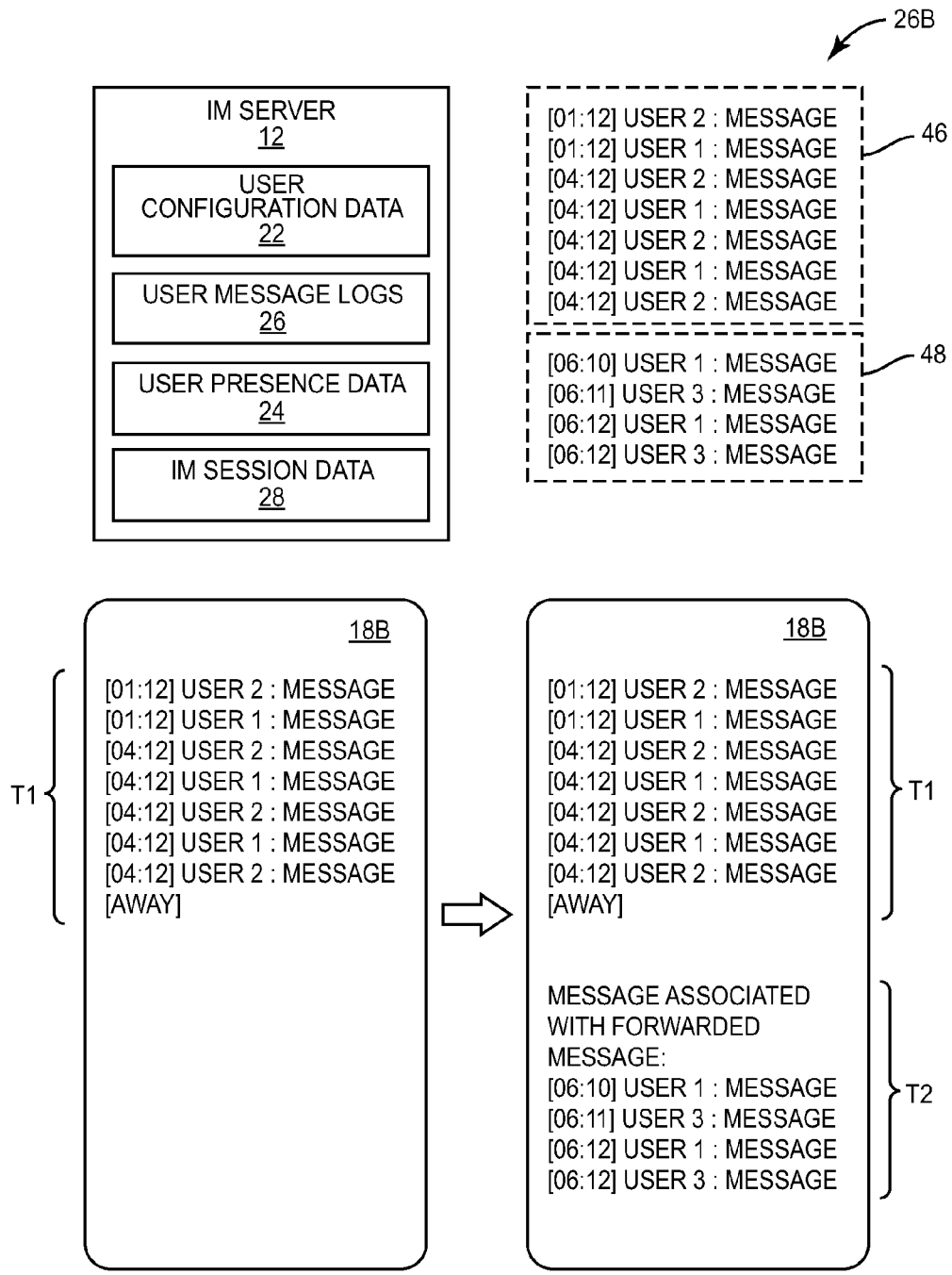
FIG. 9 is a block diagram illustrating message log sections according to one embodiment.

FIG. 9 is a block diagram illustrating message log sections according to one embodiment. In this embodiment, a user message log 26 may be segmented into multiple sections, each section relating to a communication with different users 20. For example, the user message log 26B may at the time T1 have log section 46 that identifies the IMs in an IM conversation between the first user 20A and the second user 20B. Assume that the first user 20A sends an IM to the second user 20B that is ultimately forwarded to the third user 20C, as discussed with regard to FIG. 2, for example. After the conclusion of the IM conversation between the first user 20A and the third user 20C, the IMs that make up such conversation may be attached (e.g., stored, inserted, or referenced) to the user message log 26B of the second user 20B, as reflected by the log section 48. All, or only some, log sections of a user message log 26 may be perceivable to the user 20 associated with the user message log 26. For example, log sections such as the log section 48, which are generated based on a forwarded IM, may or may not be viewable by the second user 20B, and may only be viewable my an administrator of the IM server 12. However, in this example, it is assumed that the log section 48 is viewable by the second user 20B, and is provided to the second user 20B, as depicted in the display 18B at time T2. The IMs may be provided to the second user 20B as they are exchanged between the first user 20A and the third user 20C, or in a group subsequent to the exchange of IMs between the first user 20A and the third user 20C, such as when the second user 20B next executes the IM client application on the computing device 14B.

Figure 10:
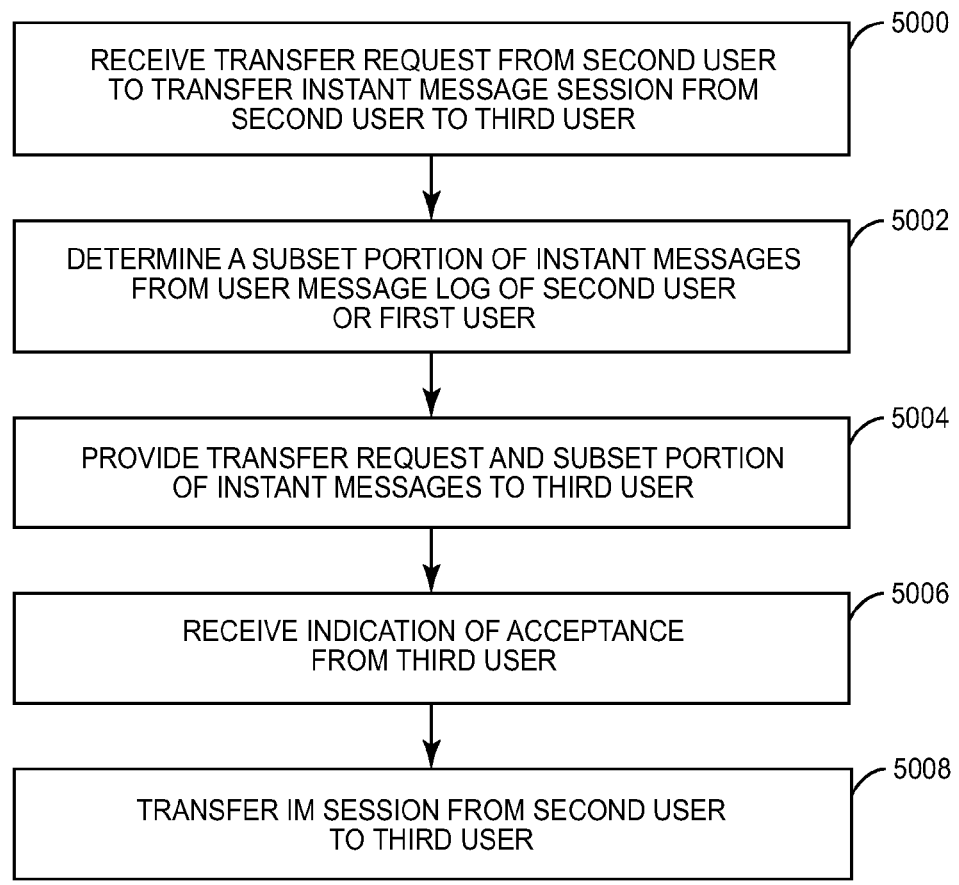
FIG. 10 is a flowchart illustrating exemplary steps for incorporating a third user into an IM session according to another embodiment.
Figure 11:
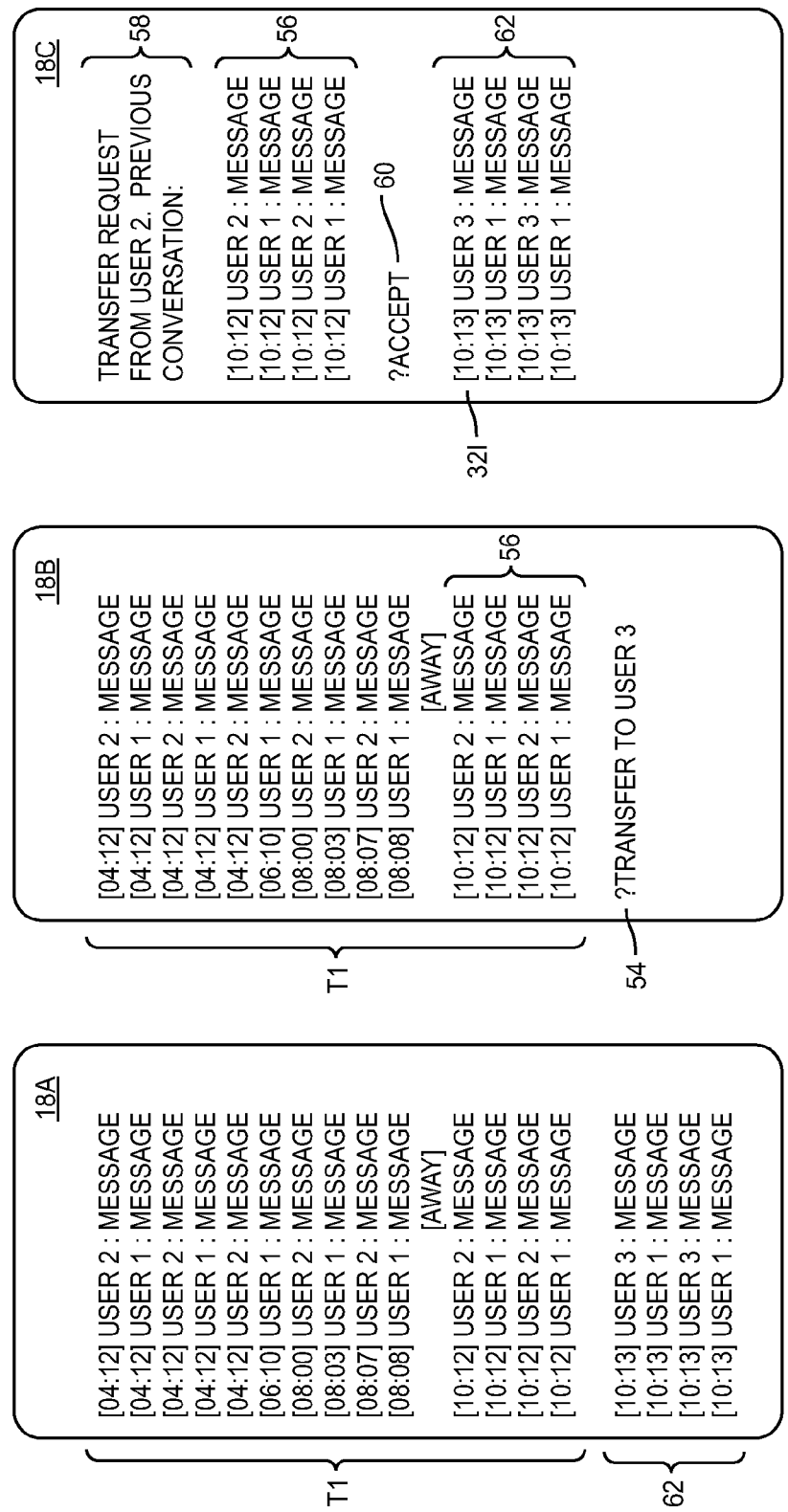
FIG. 11 is a block diagram depicting exemplary displays, IMs, and control commands that may be presented in the course of an IM session transfer, according to one embodiment.

FIG. 10 is a flowchart illustrating exemplary steps for incorporating a third user into an IM session according to another embodiment. In this embodiment, the incorporation of a third user is in response to a request to transfer an existing IM session from one user 20 to another user 20. FIG. 11 is a block diagram depicting exemplary displays, IMs, and control commands that may be presented in the course of an IM session transfer, according to one embodiment. FIG. 10 will be discussed in conjunction with FIG. 11.

Initially, assume that at the time T1 the first user 20A and the second user 20B are engaged in an IM conversation, and the IMs identified by the bracket T1 have been exchanged between the two users 20 over the course of the IM conversation and previous IM conversations. Assume further that the first user 20A has requested information from the second user 20B that the second user 20B is not able to provide, but the second user 20B is aware that the third user 20C can provide such information. The second user 20B, in response to the request of the first user 20A, enters a transfer request 54 requesting that the IM session be transferred from the second user 20B to the third user 20C. The ability to request a transfer can be implemented in any of a plurality of different of ways by the client application executing on the computing device 14B, such as via a particular user-selected button, via a predetermined command preceded by a special character that is entered by the second user 20B (as illustrated, for example, by the transfer request 54), or via any other desired mechanism. The computing device 14A provides the transfer request 54 to the IM server 12 in any desirable format, such as a transfer request packet identifying the first user 20A, the second user 20B, and the third user 20C.

The IM server 12 receives the transfer request packet from the second user 20B to transfer the IM session from the second user 20B to the third user 20C (step 5000). In response, to give the third user 20C context for the IM session that is being transferred, the IM server 12 accesses either the user message log 26A associated with the first user 20A, or the user message log 26B associated with the second user 20B, and automatically determines a subset portion 56 of IMs to provide to the third user 20C (step 5002). The determination of the subset portion 56 may be made in any desirable manner, including those discussed with regard to FIGS. 7 and 8.

The IM server 12 provides the transfer request and the subset portion 56 to the computing device 14C of the third user 20C (step 5004). The computing device 14C may provide an explanatory message 58 indicating that the second user 20B is requesting the transfer of an IM session, and may display the subset portion 56 on the display 18C to allow the third user 20C to decide whether to accept the transfer request or reject the transfer request.

In this example, the third user 20C accepts the transfer request, and provides an indication of acceptance through a predetermined action, such as the entry of a particular acceptance indication 60. The indication of acceptance is received by the IM server 12 (step 5006). In response, the IM server 12 modifies the IM session data 28 to indicate that the session has been transferred from the second user 20B to the third user 20C, such that subsequent IMs from the third user 20C will be automatically conveyed to the first user 20A and subsequent IMs from the first user 20A will be automatically conveyed to the third user 20C (step 5008).

The third user 20C may then send an IM 321 to the first user 20A, ultimately resulting in a plurality of IMs exchanged between the first user 20A and the third user 20C, as indicated by brackets 62. Such IMs may be attached to the user message log 26B of the second user 20B and displayed on the display 18B, or may not be viewable by the second user 20B.

Figure 12:
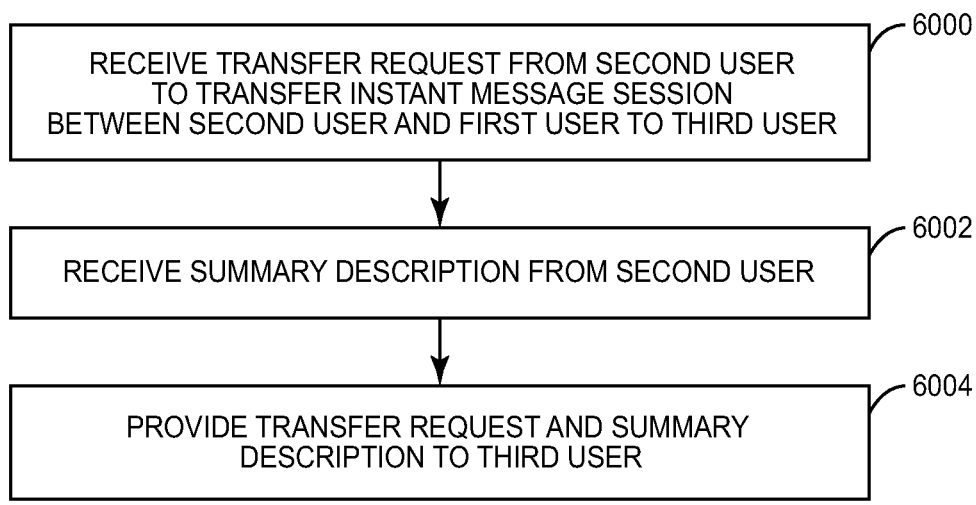
FIG. 12 is a flowchart illustrating exemplary steps for providing a summary description in conjunction with an IM session transfer request according to one embodiment.
Figure 13:
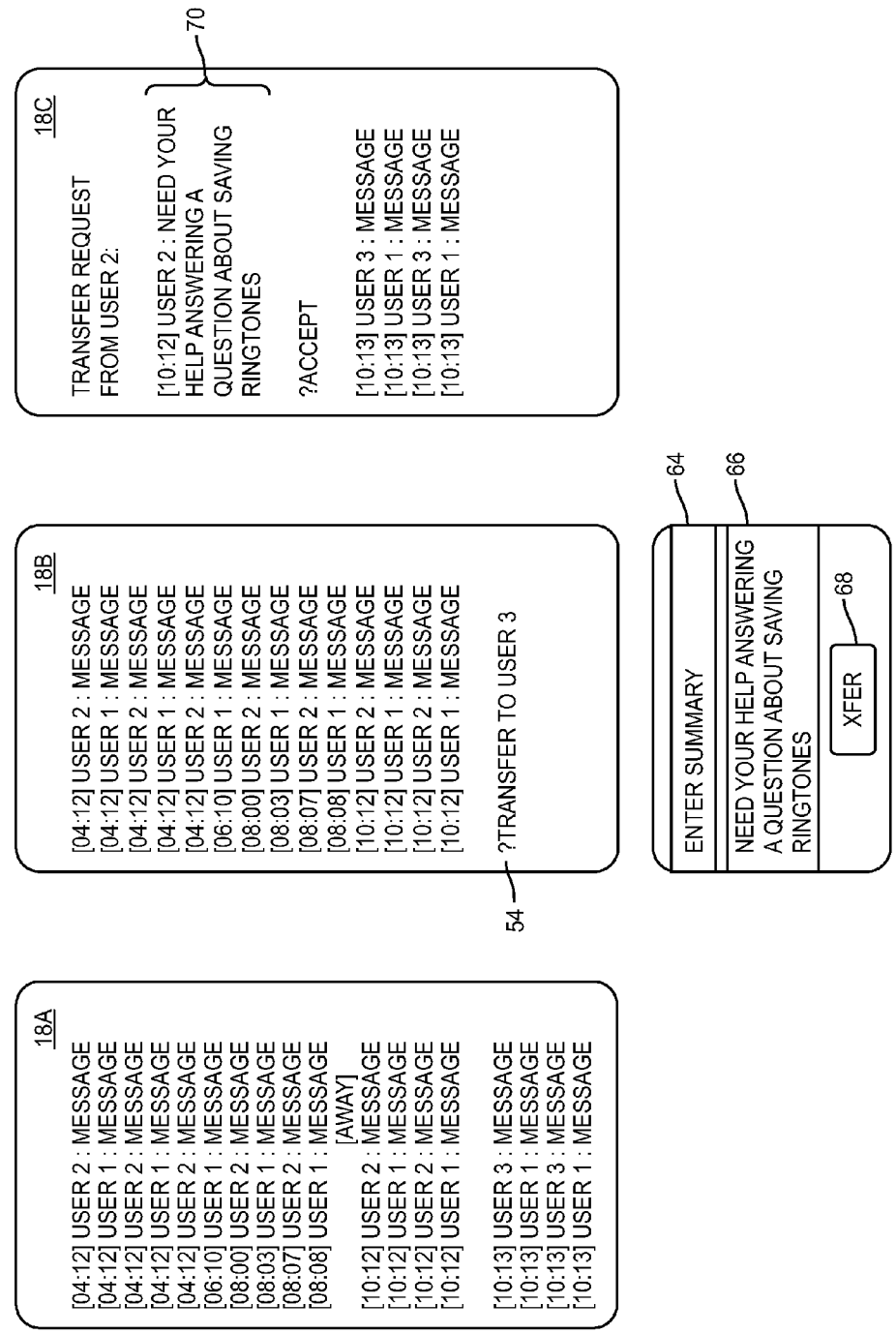
FIG. 13 is a block diagram depicting exemplary displays, IMs, and control commands that may be presented in the course of providing a summary description, as discussed with regard to FIG. 12.

FIG. 12 is a flowchart illustrating exemplary steps for providing a summary description in conjunction with a request to transfer an IM session according to one embodiment. FIG. 13 is a block diagram depicting exemplary displays, IMs, and control commands that may be presented in the course of providing a summary description, as discussed with regard to FIG. 12. FIG. 12 will be discussed in conjunction with FIG. 13. Assume, as discussed with regard to FIGS. 10 and 11, that the second user 20B has decided to issue a transfer request 54 to transfer the IM session from the second user 20B to the third user 20C. In this embodiment, however, in response to the entry of the transfer request 54, the IM client application executing on the computing device 14B displays a dialog box 64, requesting that the second user 20B enter a summary description 66 that may be provided to the third user 20C prior to, or subsequent to, the third user 20C accepting the transfer request. After the second user 20B enters the summary description 66, the computing device 14B provides the transfer request and the summary description 66 to the IM server 12. The IM server 12 receives the transfer request and the summary description 66 (steps 6000, 6002), and provides the transfer request and the summary description 66 to the third user 20C via the third computing device 14C (step 6004). The third user 20C may then review the summary description 66, as depicted on the display 18C as message 70, and decide whether to accept the transfer request or reject the transfer request based on the summary description 66. Thus, the summary description 66 is a means by which the second user 20B can summarize the reason why the transfer request is being made, which may not be otherwise clearly ascertainable from, for example, a subset portion of IMs between the first user 20A and the second user 20B.

If the third user 20C accepts the transfer request, processing may continue as described with regard to steps 5006 and 5008 of FIG. 10. In another embodiment, the third user 20C may reject the transfer request, and may provide a message identifying a reason why the request is rejected (not shown), which in turn may be provided to the second user 20B via the computing device 14B. The mechanism by which the third user 20C may enter the message could be similar to that used by the second user 20B to provide the summary description 66. In particular, upon entry of an indication by the third user 20C that the third user 20C is rejecting the transfer request, the client application executing on the computing device 14C may provide a dialog box requesting the third user 20C to enter a reason for the rejection, which may then be provided in conjunction with the rejection to the IM server 12.

Figure 14:
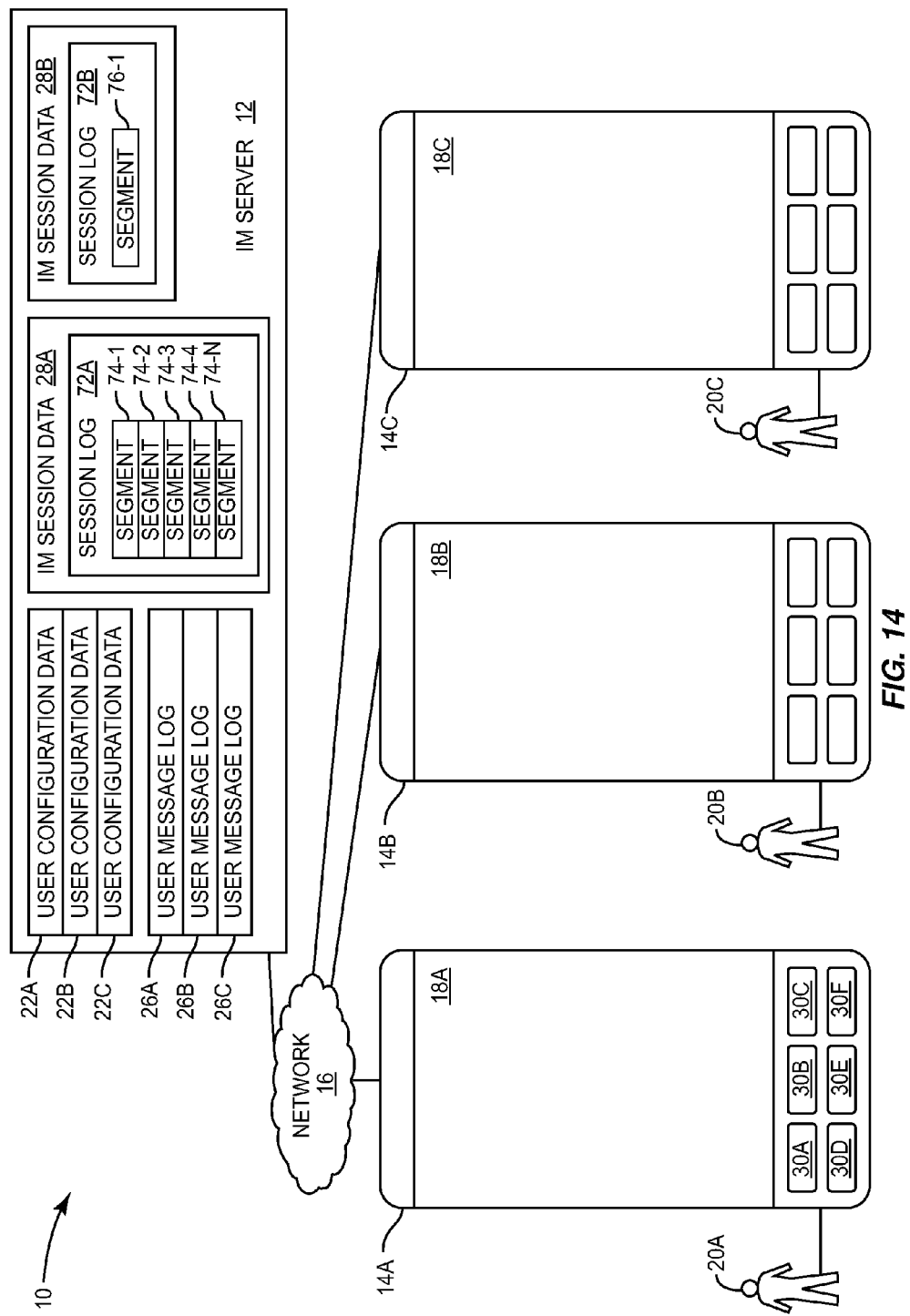
FIG. 14 is an exemplary block diagram of the IM system illustrated in FIG. 1, according to another embodiment.

In the previous embodiments, the user message logs 26 were discussed in association with particular users 20. In another embodiment, a session message log maintained by the IM server 12 may be associated with a particular IM session rather than a user 20, and different portions of communications between users 20 during an IM session may be stored in different segments of the same session message log. FIG. 14 is an exemplary block diagram of the IM system illustrated in FIG. 1, according to an embodiment wherein the IM server 12 maintains a session log 72A (generally, session log 72), which comprises multiple segments 74-1-74-N (generally, segment 74 or segments 74), wherein each segment 74 may contain a particular segment of IM communications between two users 20 during the respective IM session.

In particular, in the context of an IM session transfer, assume that initially the first user 20A and the second user 20B begin an IM conversation. This conversation, as it develops, may be stored in the session log 72 as the segment 74-1. Assume further that at some point in time, the second user 20B determines that the third user 20C would be better suited to respond to the first user 20A than the second user 20B. The second user 20B enters a control command to transfer the IM session to the third user 20C. Assume that this action initiates a second IM session which is between the second user 20B and the third user 20C, wherein the second user 20B and the third user 20C engage in a discussion about the nature of the communications between the first user 20A and the second user 20C. The IM server 12 maintains IM session data 28B regarding the second IM session, including a session log 72B. The communications between the second user 20B and the third user 20C are stored in the session log 72B as a segment 76-1, and may also be stored in the session log 72A as a segment 74-2. Upon transfer of the IM session to the third user 20C, the conversation between the first user 20A and the third user 20C may be recorded in the segment 74-3, such that each segment 74 represents IM communications between two different users 20, as the IM session is transferred from one user 20 to another user 20.

In another embodiment, the second user 20B may designate which segments 74 of the session log 72A will be accessible to the third user 20C upon session transfer. Such designations may be stored as part of the IM session data 28A, wherein each user 20 may only be permitted to perceive certain segments 74 of the session log 72A. For example, assume that immediately prior to transfer of the IM session to the third user 20C, segments 72-1-72-4 are in existence. The second user 20B may desire that the third user 20C not be able to view the communications associated with the segment 72-2, and may therefore designate that the third user 20C should be able to perceive only the segments 74-1, 74-3, and 74-4. In another embodiment, any user 20 that has participated in IM communications for a particular segment 74 may designate the segment 74 as "Private," such that only the users 20 whose IMs are stored in such segment 74 may have access to such segment 74. In yet another embodiment, the second user 20B may be able to edit sections or words contained in a segment 74 to prevent the third user 20C from viewing such sections or words.

In yet another embodiment, the session log 72A may be addressable via a Uniform Resource Locator (URL), or other suitable reference, that can be forwarded to another user 20 and can be viewed separately, via a web browser. For example, assume that the second user 20B desires to transfer the IM session between the first user 20A and the second user 20B, and initiates a second IM session to discuss the transfer with the third user 20C. The second user 20B may forward in the second IM session a URL of the session log 72A to the third user 20C. The third user 20C may then select the URL; view, perhaps via a web browser, one or more of the segments 74; and quickly ascertain the nature of the IM session.

In another embodiment, access to particular segments 74 by a viewer of a session log 72 may be limited to those segments 74 that contain a conversation in which the viewer of the session log 72 participated.

Figure 15:
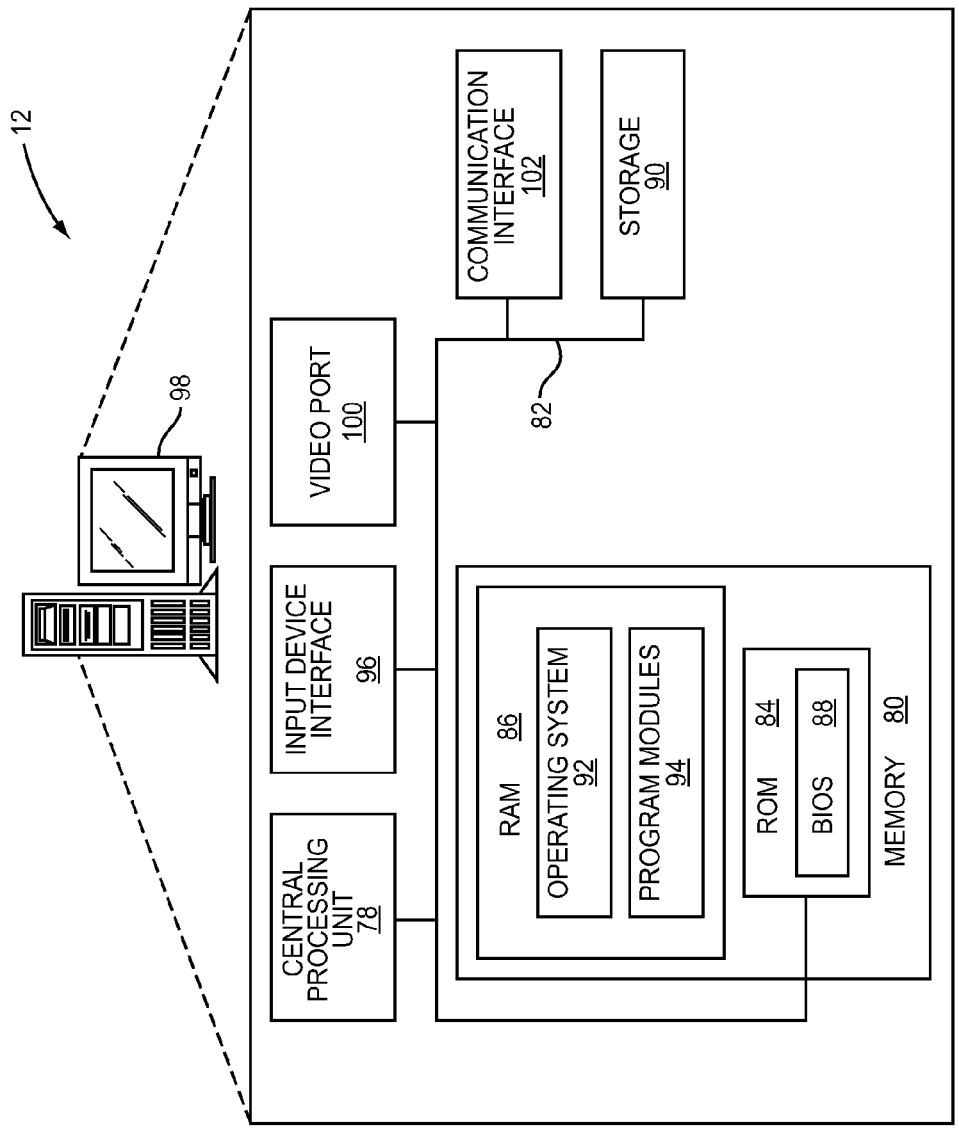
FIG. 15 is a block diagram of an exemplary IM server according to one embodiment.

FIG. 15 is a block diagram of an exemplary IM server 12 according to one embodiment. The IM server 12 may comprise, for example, a conventional or special-purpose computer that contains software, hardware, and firmware, or any combination thereof, suitable for implementing the functionality discussed herein. In addition to components discussed previously herein, the exemplary IM server 12 may also include a processor, such as a central processing unit 78, a system memory 80, and a system bus 82. The system bus 82 provides an interface for system components including, but not limited to, the system memory 80 and the central processing unit 78. The central processing unit 78 can be any of various commercially available or proprietary processors. Dual microprocessors and other multi-processor architectures may also be employed as the central processing unit 78.

The system bus 82 may be any of several types of bus structures that may further interconnect to a memory bus (with or without a memory controller), a peripheral bus, and/or a local bus using any of a variety of commercially available bus architectures. The system memory 80 may include non-volatile memory 84 (e.g., read only memory (ROM), erasable programmable read only memory (EPROM), electrically erasable programmable read only memory (EEPROM), etc.) and/or volatile memory 86 (e.g., random access memory (RAM)). A basic input/output system (BIOS) 88 may be stored in the non-volatile memory 84, and can include the basic routines that help to transfer information between elements within the IM server 12. The volatile memory 86 may also include a high-speed RAM, such as static RAM, for caching data.

The IM server 12 may further include a storage 90, which may comprise, for example, an internal hard disk drive (HDD) (e.g., enhanced integrated drive electronics (EIDE) or serial advanced technology attachment (SATA)) for storage, flash memory, or the like. The user configuration data 22, user presence data 24, user message logs 26, and IM session data 28, for example, may be stored in the storage 90. The storage 90 and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage 90 or in the volatile memory 86, including an operating system 92 and one or more program modules 94, which may implement the functionality described herein in whole or in part, including, for example, functionality associated with forwarding IMs, transferring IM sessions, determining subset portions of a plurality of IMs, and other processing and functionality described herein. It is to be appreciated that the embodiments can be implemented with various commercially available operating systems 92 or combinations of operating systems 92.

All or a portion of the embodiments may be implemented as a computer program product, such as a non-transitory computer-usable or computer-readable medium having a computer-readable program code embodied therein. The computer-readable program code can include software instructions for implementing the functionality of the embodiments described herein when executed on the central processing unit 78. The central processing unit 78, in conjunction with the program modules 94 in the volatile memory 86, may serve as a control system for the IM server 12 that is configured to, or adapted to, implement the functionality described herein.

An administrator may be able to enter commands and information into the IM server 12 through one or more input devices, such as, for example, a touch-sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 78 through an input device interface 96 that is coupled to the system bus 82, but can be connected by other interfaces such as a parallel port, an IEEE 1394 serial port, a game port, a universal serial bus (USB) port, an IR interface, etc.

The IM server 12 may drive a separate or integral display device 98, which may also be connected to the system bus 82 via an interface, such as a video port 100. The IM server 12 preferably includes a communication interface 96 for communicating with the network 16 (FIG. 1).

The computing devices 14 may, in terms of hardware, have similar or identical components to those discussed herein with regard to the IM server 12, but may be in a different form factor, such as a smartphone, as discussed previously. In particular, the computing devices 14 include a central processing unit 78; a storage 90; an operating system 92; program modules 94 which, in conjunction with the central processing unit form a control system to implement the functionality discussed herein; and communication interfaces 102 for communicating with the network 16.

Those skilled in the art will recognize improvements and modifications to the preferred embodiments of the present disclosure. All such improvements and modifications are considered within the scope of the concepts disclosed herein and the claims that follow.

What is claimed is:

1. A method for forwarding an instant message (IM), comprising:
   receiving, by an IM server executing on a computing device, a first IM from a first user directed toward a second user;
   making a determination, by the IM server, that the second user is not available to respond to the first IM based on at least one of configuration parameters indicating that the second user is not available and a determination that the second user does not have a client IM application running; and
   in response to the determination:
     identifying, by the IM server, a third user to whom the first IM is to be forwarded, wherein the third user is different from the second user; and
     wherein identifying the third user comprises:
       identifying the first user;

accessing configuration data associated with the second user; and determining that the third user is identified in the configuration data as a user to whom the first IM is to be forwarded;

automatically initiating, by the IM server, an IM session between the first user and the third user; and automatically forwarding, by the IM server, the first IM to the third user.

2. The method of claim 1, further comprising:

receiving from the first user and the third user a plurality of IMs including the first IM during the IM session; and attaching a copy of each of the plurality of IMs to a message log associated with the second user.

3. The method of claim 1, further comprising determining that the third user is available to respond to the first IM prior to automatically forwarding the first IM to the third user.

4. The method of claim 1, further comprising attaching a copy of the first IM to a message log associated with the second user.

5. The method of claim 1, further comprising:

receiving, by the IM server, a second IM from a fourth user directed toward the second user;

making a second determination, by the IM server, that the second user is not available to respond to the second IM;

in response to the second determination, identifying a fifth user to whom the second IM is to be forwarded, wherein the fifth user is different from the second user and the third user; and automatically forwarding, by the IM server, the second IM to the fifth user.

6. The method of claim 1, further comprising:

determining, by the IM server, a subset portion of a plurality of IMs previously communicated between the first user and the second user prior to receiving the first IM from the first user; and automatically providing, by the IM server, the subset portion to the third user in conjunction with automatically forwarding the first IM to the third user.

7. The method of claim 6, wherein determining the subset portion of the plurality of IMs comprises:

accessing a message log of one of the first user and the second user identifying the plurality of IMs previously communicated between the first user and the second user;

identifying a most recent IM of the plurality of IMs;

accessing a plurality of successive IMs in chronological order;

determining that a gap of time greater than a predetermined amount of time exists between a first successive IM and a second successive IM of the plurality of successive IMs; and selecting as the subset portion the most recent IM, the first successive IM, and each IM chronologically between the most recent IM and the first successive IM.

8. The method of claim 1, wherein making the determination that the second user is not available to respond to the first IM comprises accessing a presence status associated with the second user, and based on the presence status, making the determination that the second user is not available.

9. The method of claim 1, further comprising:

accessing a do not forward list identifying a plurality of users; and determining that the first user is not identified in the do not forward list prior to automatically forwarding the first IM to the third user.

10. A computing device configured to forward an instant message (IM), comprising:

a communication interface configured to communicate with a network; and an IM server comprising a control system coupled to the communication interface and configured to:

receive a first IM from a first user directed toward a second user;

make a determination that the second user is not available to respond to the first IM based on at least one of configuration parameters indicating that the second user is not available and a determination that the second user does not have a client IM application running; and in response to the determination:

identify a third user to whom the first IM is to be forwarded, wherein the third user is different from the second user; and wherein identifying the third user comprises:

identifying the first user;

accessing configuration data associated with the second user; and determining that the third user is identified in the configuration data as a user to whom the first IM is to be forwarded;

automatically initiate, by the IM server, an IM session between the first user and the third user; and automatically forward the first IM to the third user.

11. A method for transferring an instant message (IM) session to a third party, comprising:

receiving, by an IM server, a transfer request from a second user who is participating in an IM session with a first user to transfer the IM session from the second user to a third user;

automatically determining, by the IM server, a subset portion of a plurality of IMs generated in the IM session between the first user and the second user;

providing, by the IM server, the transfer request and the subset portion to the third user prior to transferring the IM session from the second user to the third user;

receiving an indication that the third user desires to accept the transfer request; and in response to the indication, transferring the IM session from the second user to the third user such that subsequent IMs from the third user will be automatically conveyed to the first user and subsequent IMs from the first user will be automatically conveyed to the third user.

12. The method of claim 11, further comprising:

receiving from the first user and the third user the plurality of IMs during the IM session; and attaching each of the plurality of IMs to a message log associated with the second user.

13. A method for transferring an instant message (IM) session to a third party, comprising:

receiving, by an IM server, a transfer request from a second user who is participating in an IM session with a first user to transfer the IM session from the second user to a third user;

receiving, by the IM server, a summary description from the second user that is not provided to the first user;

automatically providing, by the IM server, the transfer request and the summary description to the third user prior to transferring the IM session from the second user to the third user;

after providing the summary description to the third user, receiving, by the IM server from the third user, an indication of acceptance of the transfer request; and in response to the indication, transferring the IM session from the second user to the third user such that subsequent IMs from the third user will be automatically conveyed to the first user and subsequent IMs from the first user will be automatically conveyed to the third user.

14. The method of claim 13, further comprising attaching the summary description to a message log associated with the first user.

15. The method of claim 13, further comprising:
after providing the summary description to the third user, receiving, by the IM server, from the third user, an indication of rejection of the transfer request; and
providing a message to the second user that the third user has rejected the transfer request.

16. The method of claim 15, wherein receiving, from the third user, the indication of rejection of the transfer request further comprises receiving, in conjunction with the indication, a message from the third user identifying a reason why the transfer request is rejected; and
wherein providing the message to the second user that the third user has rejected the transfer request further comprises providing the message from the third user to the second user.

17. The method of claim 16, further comprising attaching the message from the third user to a message log associated with the first user.

* * * * *